Sept. 1, 1964 A. MILLER 3,147,063

STYLUS APPARATUS

Filed Dec. 19, 1961

INVENTOR.
ARTHUR MILLER

BY Rines and Rines

ATTORNEYS

United States Patent Office 3,147,063
Patented Sept. 1, 1964

3,147,063
STYLUS APPARATUS

Arthur Miller, Brookline, Mass., assignor, by mesne assignments, to Hewlett-Packard Company, Palo Alto, Calif., a corporation of California

Filed Dec. 19, 1961, Ser. No. 160,513
1 Claim. (Cl. 346—139)

Figures 1, 1A, 2:
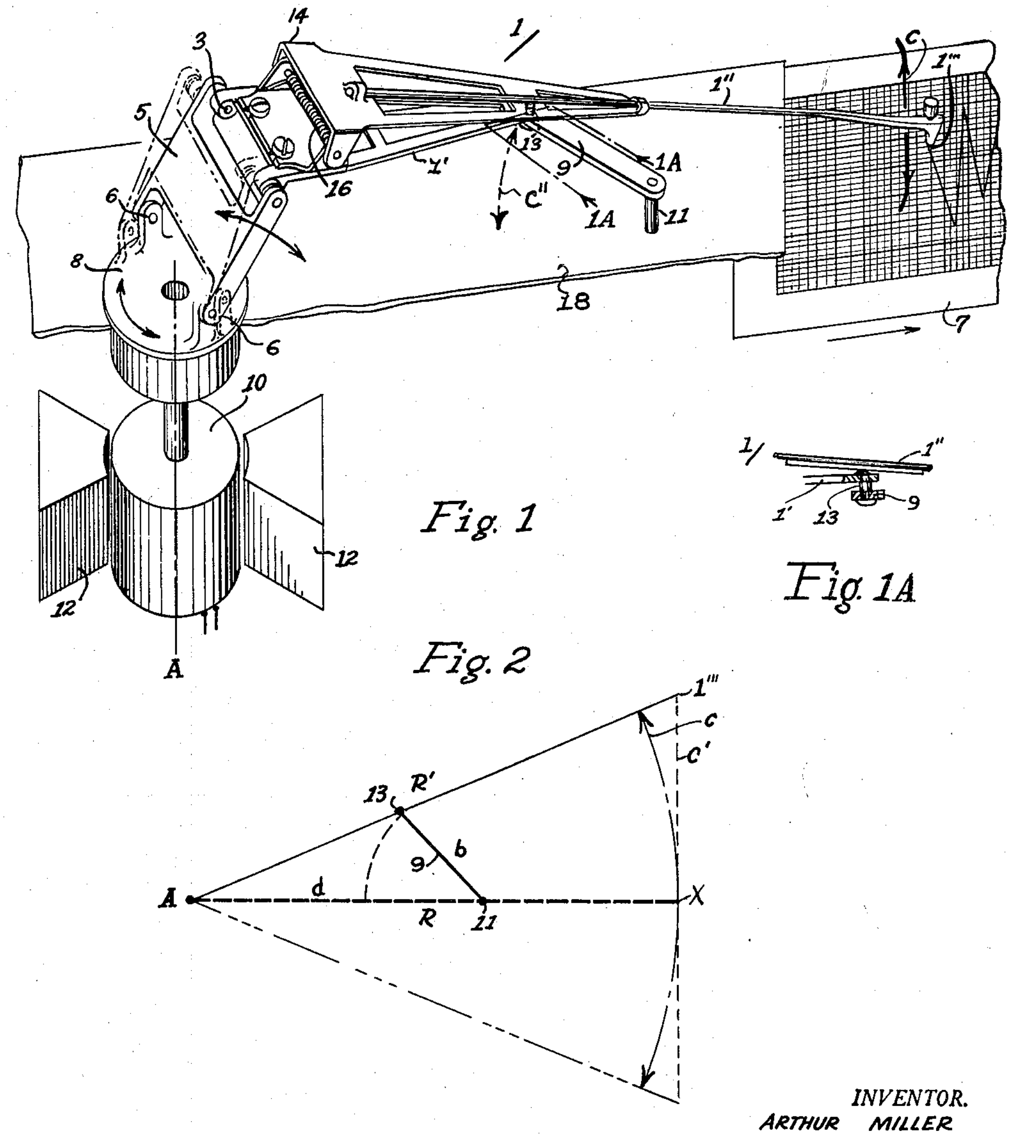

The present invention relates to stylus apparatus and, more particularly, to electrically operated stylus apparatus as of the type employed in recording machines, electrocardiograph apparatus and similar equipment.

Numerous applications for writing or other indicating styli have been evolved throughout the years for use in medical, industrial and other recording or indicating apparatus, in accordance with which the stylus is caused to move back and forth, under the control of a signal, over some recording or other indicating medium, such as a chart or paper, in order to produce thereupon an indication of the amplitude and other properties of the signal that is deflecting the stylus. In many of these equipments, the stylus arm is rotatably pivoted about a fixed point in response to, for example, the operation of a galvanometer or other electrically operated signal driving mechanism, and an indicating or writing stylus, at the other end of the arm, produces an indication upon an appropriate recording medium or chart that is moved thereby. When a signal causes deflection of the stylus arm, the indicating end thereof describes an arcuate path, which, for small angles of deflection, is substantially linear. Where, however, large signal amplitudes are to be indicated, so that the stylus must be moved through a considerable angle of rotation, this linear approximation no longer holds true. The recorded signal then appears arcuate instead of straight with respect to the coordinates of the recording chart or paper being drawn thereunder.

Several proposals have accordingly been advanced for linearizing the movement of the indicating end of the stylus. Various types of linearizing link arm constructions have been evolved for enabling the length of the stylus arm to change as the deflection angle thereof increases, thereby to cause the writing or indicating end thereof to describe a substantially linear path and to produce indications on the record medium or chart that are straight with respect to the calibrations of the chart, even for large amplitude deflections. These proposals have utilized a further link arm that is fixedly pivoted and that causes the stylus arm, through an appropriate series of linkages or the like, to expand or contract in length, as needed, thus to provide correction or compensation for the otherwise arcuate path that would be described by the stylus arm. In such systems, the signal drive of the stylus is usually effected at the said pivot point of the compensating link arm, so that the drive no longer is effected at the other end of the stylus, as has been customary in galvanometer-driven styli and the like. When the drive for the stylus arm is located at such compensatory link pivot point, instead of at the other free end of the stylus arm, however, there will be a greater angle of deflection, which particularly through the numerous link arms necessary, introduces greater errors, later discussed, than are inherent in rotating the arm about its full length.

It is also advantageous to maintain the drive at an end of the stylus arm, rather than at an intermediate point thereof, as in these prior-art proposals, in order to avoid the necessity for sliding joints and the like, with inherent sliding fits and friction problems, that are needed to vary the length of the stylus.

An object of the present invention, accordingly, is to provide a linear stylus driving system that is not subject to these prior-art difficulties but that, to the contrary, enables a minimum of system errors to be generated and obviates the necessity for sliding joints and complicated link structures and the like.

A further object is to provide a new and improved stylus of more general character, also.

Other and further objects will be explained hereinafter and will be more particularly pointed out in connection with the appended claims.

In summary, however, the invention relates, from one of its aspects, to a signal-controlled stylus having, in combination, a longitudinally extending stylus arm provided with an indicating member, such as a writing stylus or the like, at one end, and rotatably pivoted at the other end; and signal-driving means disposed to deflect the stylus arm from its center position of rest about the rotatable pivot, at the said other end, in response to the signals-to-be-indicated, the stylus arm being hingedly connected to the rotatable pivot in order to permit longitudinal movement of the stylus arm with respect to the center of the rotatable pivot. A further fixed pivot is disposed at a predetermined point along, but out of the plane of the stylus arm, when in its center position of rest, and a crank arm is connected at one end to the further fixed pivot and rotatably linked at the other end to an intermediate point of the stylus arm in order that signal-controlled deflection of the stylus arm about the said rotatable pivot, that would ordinarily cause the indicating member to describe a path of arcuate contour, will effect angular rotation of the crank arm about the further fixed pivot and consequent longitudinal movement of the stylus arm through the hinge connection, thereby to modify the contour of the said path; for example, to provide a linear contour. Preferred constructional details are hereinafter set forth.

The invention will now be described in connection with the accompanying drawing. FIG. 1 is a perspective view illustrating the invention in preferred form;

FIG. 1A is a fragmentary section taken along the line 1A—1A of FIG. 1, looking in the direction of the arrows; and FIG. 2 is a geometrical diagram illustrative of the principles of operation of the system of FIG. 1.

Referring to FIG. 1, a stylus arm is shown generally at 1, comprising a first member 1′ that is, in accordance with the present invention, hingedly connected at its left-hand end 3 to the upper end of a link 5, the lower end of which is hinged at diametrically opposed points 6 of a substantially cylindrical rotatable pivot member 8, of a vertical rotation axis A. The link 5 is thus doubly hinged about the points 3 and 6 to cause the stylus arm member 1′ to move forward and backward relative to the axis A of the rotatable pivot member 8. The pivot member 8 is, in turn, angularly driven by, for example, a galvanometer coil 10, operating between fixed magnetic pole pieces 12, as is well known, in order to deflect the stylus arm 1, from its central or fixed position of rest. The arm member 1′ carries a slender extension 1″ that terminates at 1‴ in a writing or other marking device for producing an indication, in the direction of the arrows C, upon a calibrated recording paper, chart or other surface 7 that may be drawn past the indicating end 1‴ of the stylus arm 1. The attachment of the extension portion 1″ of the stylus arm 1 is shown hingedly pivoted or mounted at 14 to the member 1′, with a spring 16 resiliently urging the same downward in order to cause the writing portion 1‴ to bear against the recording paper, chart or other recording-medium surface 7. The path C described by the writing end 1‴ would ordinarily be substantially circular, as before described, though for small angles, it is approximately linear.

In accordance with the present invention, the drive is maintained at the rotation axis region A, and a crank-arm 9 is provided in a plane preferably slightly below the plane of the portion 1″ of the stylus arm 1, fixedly pivoted at a predetermined point 11 to the upper surface 18 of the apparatus carrying the stylus arm 1, and rotatably pivoted at the further pivot point 13, FIG. 1A, to an appropriate intermediate point of the stylus arm 1, preferably near the end of the portion 1′ thereof. Thus, as the signal drive causes the arm 1 to become deflected along the contour C, the crank-arm 9 will pivot about the pivot point 11 in the direction of the arc C″, and thereby exert, through the action of the rotary coupling or pivoting 13, a forward or rearward force in the longitudinal direction of the arm 1. This causes the link member 5 hingedly to move forward or rearward, as indicated in solid and dotted lines, thus to compensate for curvature in the ordinary or normal path described by the writing end 1‴ of the stylus 1, and to modify or change the circular contour thereof. By proper selection of the positioning of links of the various parts, this change of contour may be effected so as to compensate for the circular arc C, FIG. 2, and to straighten the same out to produce the substantially linear path C′.

In FIG. 2, the rotatable pivot member 8, driving the stylus arm 1, is schematically shown at A, and the indicator end is shown at 1‴. The length of the stylus arm 1, between the center axis A and the point X, as shown in dotted lines, is represented by the letter R, and the pivot point 11 is shown at a distance *d* therealong. The crank-arm 9 is shown of length *b*. In the deflected position R′, the stylus arm 1 is shown extended, through the action of the hinged member 5 of FIG. 1, to an appropriate length so that the curved contour C has been straightened out to a substantially linear path C′. The complementary diagram for deflection on the other side of the central position of rest of the arm 1 (shown in dotted lines between points A and X) is also shown in dotted lines in FIG. 2. It has been found that the relationship for converting the circular or arcuate contour of the path C into the substantially linear contour C′ is substantially as follows:

$$b=\frac{K^2}{K+1}R$$

where K equals $d/R$.

It will be observed that the correction of the recording path to linearize the same, has been effected without changing the position of drive of the stylus arm 1 and therefore without the introduction of the additional errors inherent in causing the drive at, for example, the pivot point 11. In addition, the use of sliding contact or other multiple link constructions, as are required in prior-art devices of this character, has been completely obviated, and in substitution therefor, there has been provided merely the use of bearing surfaces and shafts, as at the double-hinged points 3 and 6 and as at 13 and 11, thus obviating friction problems, sliding problems and other disadvantageous features of the prior art.

A typical construction, in accordance with the present invention, would have the following dimensions:

$R$=100 millimeters
$b$=22.5 millimeters
$d$=60 millimeters
Maximum deflection from center—25 mms.

If, in accordance with the prior art before-discussed, the drive had been at pivot point 11, the galvanometer would rotate that pivot through an angle of 9.6 degrees to produce a 10 mm. deflection of the stylus tip 1‴. For twice the input current, the galvanometer would rotate 19.2°, but the resulting deflection would be only 19 millimeters, rather than the expected 20. At 2.5 times the original input, the galvanometer would rotate 24°, but the deflection would miss its hoped-for 25 millimeters by a full 2 mms.

For the same stylus length, however, the present invention would require a galvanometer rotation of only 5.73 degrees for the first 10 mm. stylus-tip deflection. For twice the input current, the resulting deflection would be 20.26 millimeters. This represents an error of .26 millimeter in comparison to a full mm. for the said prior-art type of drive. At 2.5 times input, the galvanometer rotation would be 14.3 degrees, and the stylus deflection would equal 25.5 millimeters, an error of only .5 millimeter in comparison with the 2 mm. error of the driven crank construction.

The trigonometry for the prior-art driven crank construction, furthermore, produces an insufficiency of deflection. If any overloading or saturation effects occur in either the galvanometer or the amplifier controlling the same, these effects will add to the trigonometrical errors, before discussed.

For the drive of FIG. 1, however, the trigonometrical error produces a slight excess of deflection. Overloading effects then tend to compensate for this error.

Further modifications will occur to those skilled in the art and all such are considered to fall within the spirit and scope of the invention as defined in the appended claim.

What is claimed is:

A signal-controlled stylus comprising: a longitudinally extensible stylus arm provided with an indicating member at one end thereof; signal driving means rotatable about a pivot axis in response to signals-to-be-indicated; hinge means connecting the stylus arm near the end thereof remote from the indicating member to said signal driving means for angularly deflecting the stylus arm from a center position of rest; said hinge means permitting longitudinal movement of the stylus arm along a radii from the pivot axis and including a double-hinged link; one of the double hinges connecting the signal driving means and the link to permit positioning thereof at various angles with respect to said pivot axis; and the other of the double hinges connecting the link with said end of the stylus arm remote from said indicating means; a fixed pivot disposed at a predetermined point away from the plane of the stylus arm and along the length thereof when in its center position of rest; and a crank arm connected at one end to the fixed pivot and pivotally attached at the other end to the stylus arm at a point therealong intermediate the pivot axis and the indicating member.

References Cited in the file of this patent

UNITED STATES PATENTS

| | | |
|---|---|---|
| 882,586 | Robinson | Mar. 24, 1908 |
| 946,304 | Zander | Jan. 11, 1910 |
| 1,189,234 | Brown | July 4, 1916 |
| 2,442,586 | Clark | June 1, 1948 |
| 2,463,882 | Kent et al. | Mar. 8, 1949 |
| 2,534,569 | Bowditch | Dec. 19, 1950 |
| 2,814,549 | Perry | Nov. 26, 1957 |

OTHER REFERENCES

"A New Straight Line Pen Mechanism" (Halsall), Instrument Practice, vol. 13, No. 8, August 1959, pages 815–822.